Nov. 10, 1953
S. W. SEELEY
2,658,993
LORAN TRANSMITTER
Filed July 10, 1946
3 Sheets-Sheet 1
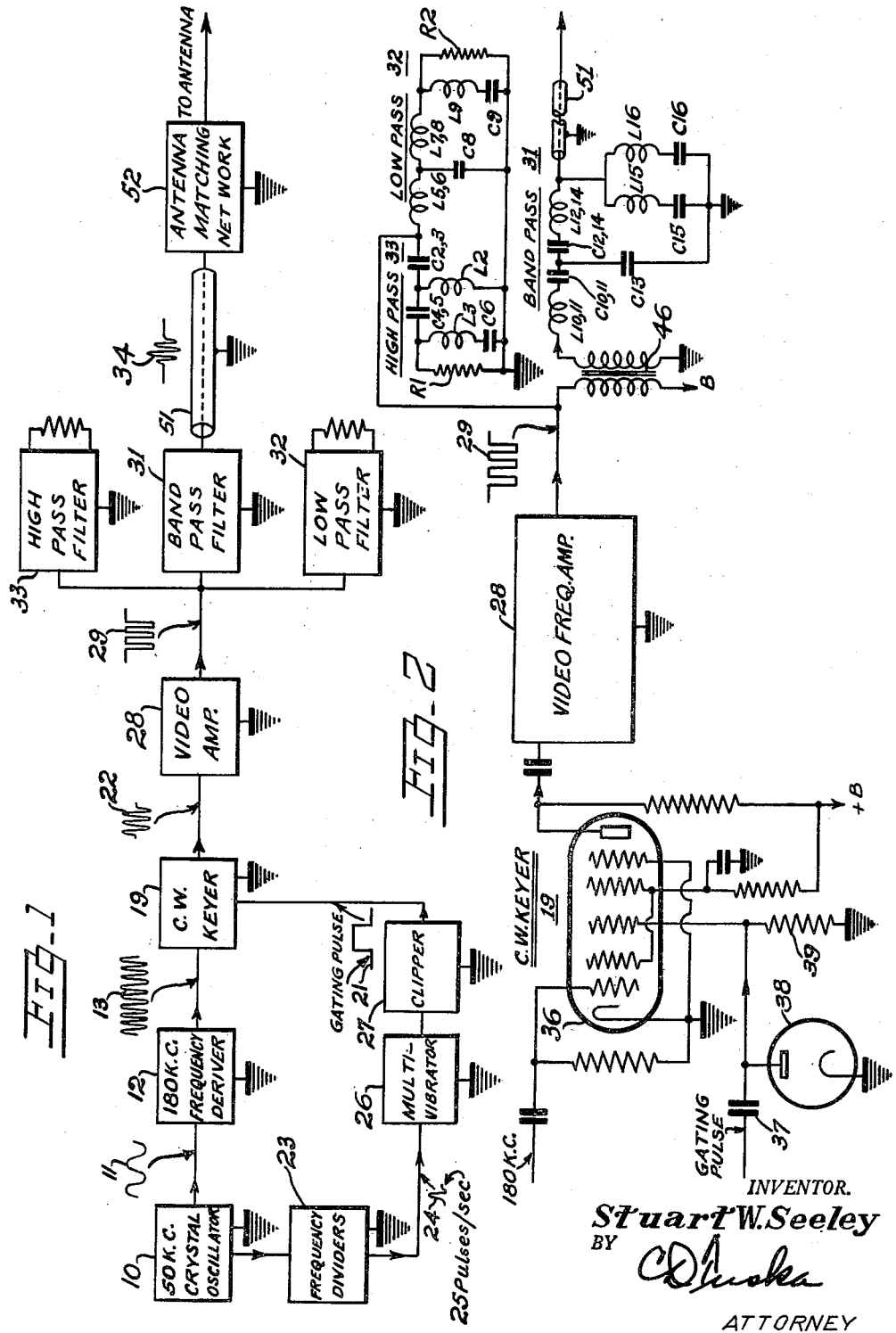
INVENTOR.
Stuart W. Seeley
BY
ATTORNEY Nov. 10, 1953  S. W. SEELEY  2,658,993
LORAN TRANSMITTER
Filed July 10, 1946  3 Sheets-Sheet 2
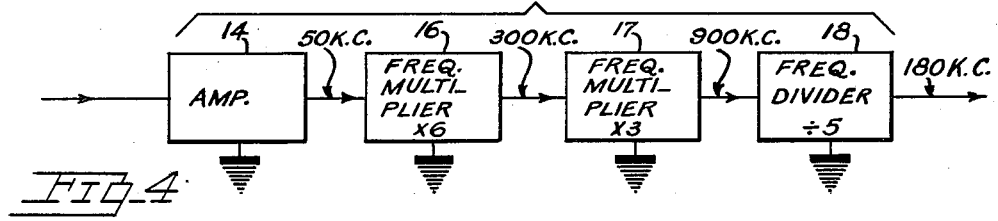
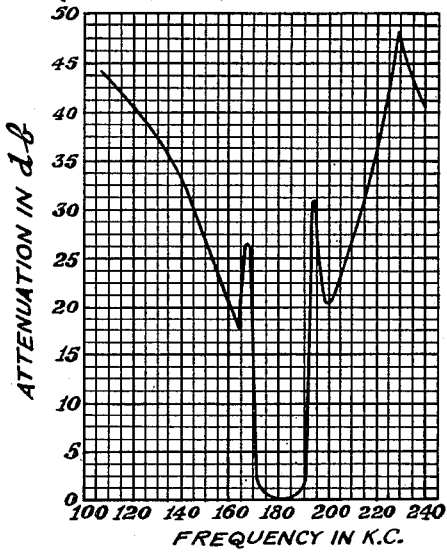
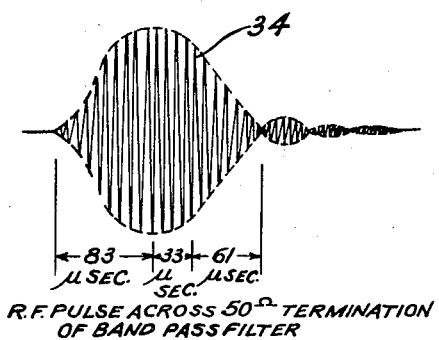
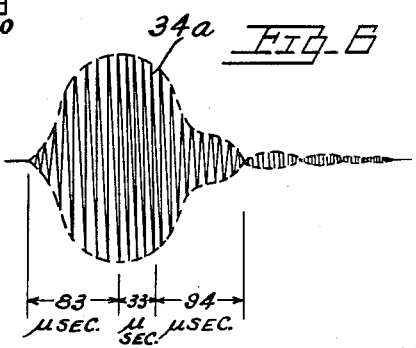
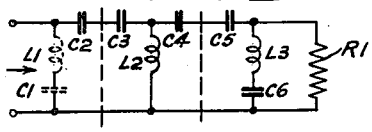
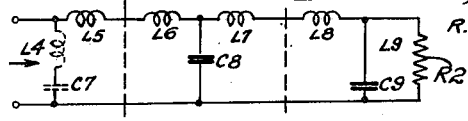
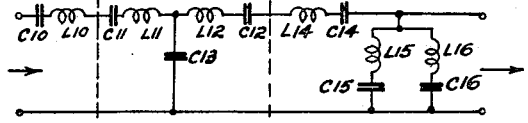
INVENTOR.
*Stuart W. Seeley*
BY
*C.D. Tuska*
ATTORNEY

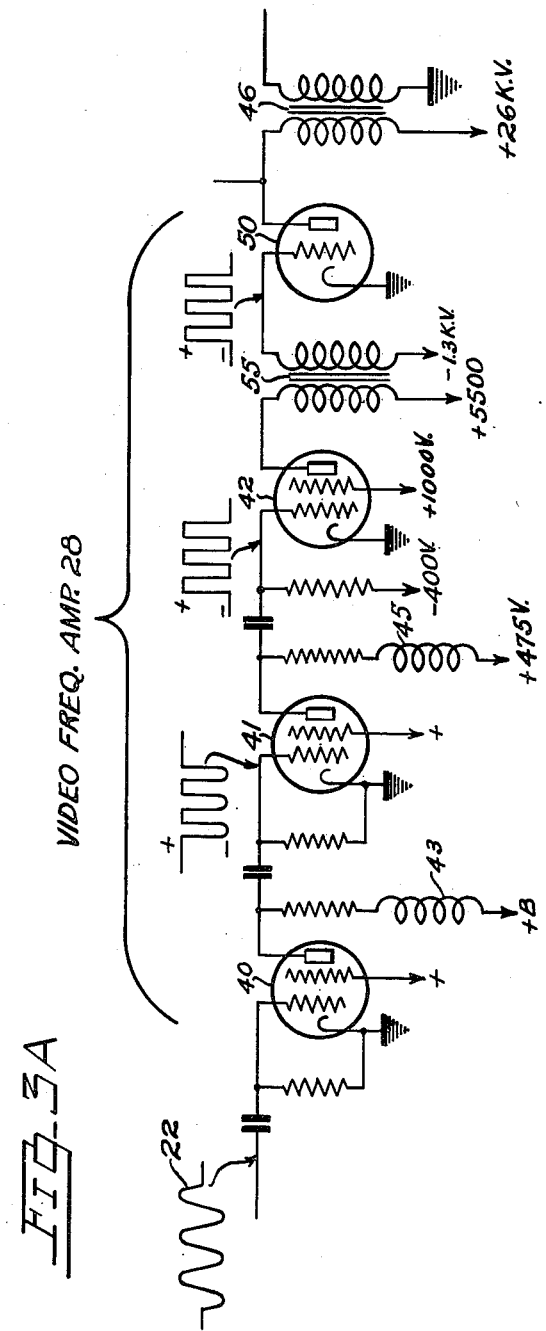

Patented Nov. 10, 1953

2,658,993

UNITED STATES PATENT OFFICE 2,658,993

LORAN TRANSMITTER

Stuart W. Seeley, Roslyn Heights, N. Y., assignor to Radio Corporation of America, a corporation of Delaware Application July 10, 1946, Serial No. 682,538

9 Claims. (Cl. 250—17)

My invention relates to the transmission of radio pulses and particularly to the transmission of pulses having a definite predetermined envelope or wave shape to facilitate the matching or superimposing of pulses in navigation or position determining systems such as loran systems or the like.

In loran systems pairs of ground stations transmit periodic radio pulses, the pairs of stations being synchronized so that the pulses from the two stations are transmitted either simultaneously or with a fixed time difference. In an aircraft, for example, using the loran system for navigation the navigator determines the time difference of the pulses received from a pair of stations by matching or superimposing on a cathode ray tube screen the pulses from the two stations and by then noting the amount that one of the pulses had to be displaced or shifted on the cathode ray sweep axis to superimpose it on the other pulse. This establishes the fact that the aircraft is on a particular "loran line" for this one pair of ground stations. The same procedure determines the loran line for a second pair of ground stations. The intersect of the two loran lines thus found is the position of the aircraft.

It is evident that, in order to obtain an exact matching of a pair of pulses, the two pulses must have the same wave shape at least in the portion of the pulse where there is to be exact superposition. The usual practice is to give the front edges of the pulses a predetermined shape and to match the pulses by obtaining exact superposition of the front edges of the pair of pulses.

It has been found difficult to shape the radio pulses to a predetermined shape and even more difficult to keep the pulses properly shaped under operating conditions. This is especially troublesome in systems where the individual radio-frequency cycles of two radio pulses are to be matched or superimposed as in the case of certain low frequency loran systems. In the transmitting equipment as previously designed, the shape of a pulse depends upon amplifier characteristics and especially upon the amplifier tube characteristics. Any change in tube bias voltage or other tube voltage or any tube replacement causes some change in the pulse shape in equipment of this type.

An object of the present invention is to provide improved radio pulse transmitting apparatus for use in radio navigation systems or the like.

A further object of the invention is to provide an improved method of and means for producing radio pulses having a definite predetermined wave shape.

A still further object of the invention is to provide an improved method of and means for producing radio frequency pulses having an envelope of a predetermined wave form.

A still further object of the invention is to provide improved transmitting apparatus for a loran system of the type wherein at the receiver individual cycles of a pair of radio pulses are to be matched.

In practicing the present invention the transmitter apparatus is so designed that all pulse shaping is done by a passive network. In a preferred embodiment of the invention pulses of radio frequency energy of sine wave form and of low power are produced and are then amplified by a video frequency amplifier to produce pulses of high power wherein both the positive and negative peaks of the R.-F. sine wave cycles are clipped off. As a result, each high power pulse of carrier wave energy comprises rectangular pulses recurring at the carrier frequency.

The high power pulses are then passed through a band pass filter which is designed to give the front edges of the envelopes of the resulting pulses the desired wave shape. Because of the filter action the rectangular pulses recurring at the carrier frequency are converted to sine wave cycles whereby the filter output consists of recurring pulses of R.-F. energy, these pulses having the desired envelope wave shape. The filter output is then supplied to the antenna without further amplification.

The invention will be better understood from the following description taken in connection with the accompanying drawing in which Figure 1 is a block diagram of one embodiment of the invention, Figure 2 is a circuit diagram of a portion of the apparatus shown in Fig. 1, Figure 3 is a block diagram of a frequency deriver unit shown in Fig. 1, Figure 3A is a circuit diagram of a video frequency amplifier unit shown in Fig. 1, Figure 4 is a graph showing the attenuation characteristic of the passive filter network shown in Fig. 1, Figures 5 and 6 are graphs showing, respectively, the shaped pulse of radio frequency energy as it appears at the filter output and as it is radiated by the antenna, and Figures 7, 8, and 9 are circuit diagrams that are referred to in describing the filters illustrated in Figure 2.

In the several figures, similar parts are indicated by similar reference characters.

Fig. 1 shows one embodiment of the invention as it may be applied to a loran transmitter station. A crystal controlled master oscillator 10 supplies a 50 kilocycle sine wave signal indicated at 11 to a frequency deriver circuit 12 that supplies a 180 kc. sine wave signal indicated at 13. As shown in Fig. 3, the unit 12 may comprise an amplifier 14, frequency multipliers 16 and 17 that multiply the frequency six times and three times, respectively, and a frequency divider 18 that divides by five.

The 180 kc. signal 13 is supplied to a continuous-wave keyer 19 that passes the signal 13 only while a gating pulse 21 is being applied thereto. As a result, periodic pulses of R.-F. energy appear in the output of the C. W. keyer 19 which have the repetition rate of the gating pulse 21. One of these R.-F. pulses is indicated at 22. The circuit of the keyer 19 is shown in Fig. 2 and will be described in detail hereinafter.

The gating pulse 21 is derived also from the master oscillator 10 so that it always has a fixed time or phase relation to the 180 kc. wave 13. The pulse 21 is derived as follows: Signal from the oscillator 10 is supplied to a chain of frequency dividers 23 such as a chain of blocking oscillators, to obtain pulses 24 occurring at the desired repetition, which in the present example is assumed to be 25 per second.

The pulses 24 trigger suitable wave shaping apparatus to produce the gating pulses 21 of the desired width or duration and having the same repetition rate as the pulses 24. The wave shaping apparatus may comprise, for example, a multivibrator 26 and a clipping or limiting circuit 27.

The R.-F. pulses 22 passed by the keyer 19 during the occurrence of the gating pulses 21 are amplified to the desired output power by a video frequency amplifier 28 which contains stages that limit or clip the R.-F. cycles. Thus, the pulses 22 are converted to pulses 29 each of which consists of a group of rectangular pulses recurring at a repetition rate that is the same as the desired carrier wave frequency, in this instance 180 kc.

The high energy pulses 29 are now supplied to the antenna (not shown) through a passive wave shaping network which comprises, in the present example, a band pass filter 31 which has coupled thereto a low pass filter 32 and a high pass filter 33 to improve its characteristics. The filter combination has a 20 kc. pass band with 180 kc. as the center frequency. Its output is a pulse 34 comprising sine wave cycles, but in this case the envelope of the pulse has a shape determined by the passive network 31, 32, 33. In particular, the first R.-F. cycles of the pulse 34 build up at a definite rate fixed by the filter network so that the front edge of the pulse 34 is always the desired predetermined wave shape. Changes in tube voltages or tube characteristics will not affect this wave shape.

Fig. 2 shows suitable circuits for the keyer 19 and the passive network 31, 32, 33. The circuit of the video amplifier 28 is shown in Fig. 3A. The keyer 19 comprises a five-grid vacuum tube 36 which has the 180 kc. signal applied to the first grid and which is biased so as not to pass any signal except during the presence of a gating pulse 21 that is applied to the third grid. The gating pulses 21 are applied to the third grid with positive polarity by way of a capacitor 37. A diode 38 and a resistor 39 are connected in parallel relation and between the grid side of capacitor 37 and ground so that a negative bias is applied to the third grid between gating pulses. This negative bias blocks the tube 19 in the absence of a pulse 21. The blocking bias is produced as a result of current flow through the diode 38 while the positive pulse 21 is present whereby a D.-C. charge is left on capacitor 37 at the end of the pulse. A small portion of the charge leaks off the capacitor 37 through the resistor 39 between successive pulses 21.

Referring to Fig. 3A, the video frequency amplifier 28 may comprise tetrodes 40, 41 and 42 which are resistance-capacity coupled in cascade and provided with the usual peaking coils 43 and 45 for holding up the high frequency response. The tubes 40, 41 and 42 clip the signal pulses 22, the tubes 41 and 42, in particular clipping the signal on the negative swings. Both the tube 42 and the output amplifier tube 50 preferably are operated class C for efficiency of operation. For this reason, a transformer 55 is employed to couple the amplifier tubes 42 and 50 so that the output pulses from the tube 42 may be reversed in polarity and applied with positive polarity to the grid of tube 50. Some of the voltages that may be employed in the video frequency amplifier are indicated in Fig. 3A merely by way of example. It will be noted that the amplifier is designed to handle a substantial amount of power.

Referring again to Fig. 2, anode circuit of the tube 50 is coupled to the passive filter network 31, 32, 33, a transformer 46 coupled into the band pass filter portion 31. The main filter 31, a high pass filter 33 and a low pass filter 32 have the attenuation characteristic shown in Fig. 4 and constitute an amplifier load that is substantially constant over a wide frequency band. Each of the filters 32 and 33 is complementary to the main band pass filter 31 and is terminated by a resistor. It is possible to so design the band pass filter 31 that it will have an input impedance equal to the desired tube plate load and an output impedance corresponding to the actual load impedance. This would obviate the need for transformer 46. Such a filter can be designed to have the same pass characteristic as that shown in Fig. 4.

In the absence of the additional filters 32 and 33, a high value of amplifier-load impedance would exist outside the main filter pass band. This would result in excessive R.-F. harmonics and pulse-repetition-rate transients at the main filter input.

As shown more clearly in Figs. 7, 8 and 9, each of the filters 31, 32 and 33 consists of an intermediate section and two half end sections. However, since the input ends of the three filters are connected in parallel, the end half sections at the input ends have their shunt arms omitted. The omitted shunt arm as indicated in dotted line in Fig. 7 and in Fig. 8 but is not indicated in Fig. 9.

The filters as shown in Fig. 2 have various elements combined. For example, in the filter 31 the inductance coil L10, 11 has a value equal to the sum of the inductances of the coils L10 and L11 shown in Fig. 9.

The filter constants are tabulated below:

(a) Band pass filter:
Characteristic impedance__ 50 ohms.
Pass band _____ 170 kc. to 190 kc.
No. of sections _____ 2.

INTERMEDIATE SECTION

| Type | Series m-derived, T-configuration. |
|---|---|
| $f_1\infty$ | 170 kc. |
| $f_2\infty$ | ∞. |

END HALF SECTIONS

| Type | Series m-derived, Mid-series termination. |
|---|---|
| $m_1$ | 0.6. |
| $m_2$ | 0.6. |
| $f_1\infty$ | 167.63 kc. |
| $f_2\infty$ | 192.69 kc. |

(b) High and low-pass filters:

|  | High Pass | Low Pass |
|---|---|---|
| Characteristic Impedance | 700 ohms | 700 ohms. |
| Cut-off Frequency | 190 kc | 170 kc. |
| No. of Sections | 2 | 2. |
| Intermediate Section: |  |  |
| Type | Constant K | Constant K. |
| Configuration | T | T. |
| $f\infty$ | 0 | ∞. |

The values of the filter elements are tabulated below where the values are in micro-henries, micro-microfarads and ohms:

(a) Band pass filter:
L10, 11 ------------------ 636.6 μh.
L12, 14 ------------------ 636.6 μh.
L15 --------------------- 790 μh.
L16 --------------------- 900 μh.
C10, 11 ------------------ 1318.6 μμf.
C12, 14 ------------------ 1318.6 μμf.
C13 --------------------- 17.700 μμf.
C15 --------------------- 865 μμf.
C16 --------------------- 990 μμf.

(b) High pass filter:
L2 ---------------------- 293 μh.
L3 ---------------------- 976 μh.
C2, 3 ------------------- 749 μμf.
C4, 5 ------------------- 749 μμf.
C6 --------------------- 1123 μμf.
R1 --------------------- 700 Ω.

(c) Low pass filter:
L5, 6 ------------------- 1048 μh.
L7, 8 ------------------- 1048 μh.
L9 --------------------- 700 μh.
C8 --------------------- 2675 μμf.
C9 --------------------- 803 μμf.
R2 --------------------- 700 Ω.

Referring to Figs. 1 and 2, the output signal of the network 31, 32, 33 is supplied, in the example illustrated, through a coaxial cable 51 of 50 ohms impedance through a suitable antenna matching network 52 to the antenna (not shown). A matching network 52 may or may not be desirable depending upon the antenna design. The feature of importance is that there are only passive networks between the output end of the video amplifier 28 and the antenna. Consequently, all pulse envelope shaping is done by passive networks, and substantially all of this shaping is done by the filter network 31, 32, 33.

Fig. 5 shows in more detail the shape of the pulse of R.-F. energy appearing at the input end of the coaxial line 51. Fig. 6 shows the shape of the corresponding R.-F. pulse 34a that is radiated from the antenna in one embodiment of the antenna with a particular antenna design. It will be apparent that the front edge of the pulse 34a is substantially as determined by the network 31, 32, 33. It will also be apparent that the shape of the pulse 34a will be independent of vacuum tube characteristics. Thus, the present invention makes it much easier to transmit from loran ground stations radio pulses of the proper shape for matching at a loran receiver, and the pulse shape when once obtained does not change.

I claim as my invention:

1. A radio pulse transmitter comprising means for producing pulses at low power level which recur at the frequency of the carrier wave to be radiated, means comprising a video frequency amplifier for amplifying said pulses and for producing pulses of high power level wherein each pulse consists of rectangular pulses recurring at said carrier wave frequency, said amplifier being of the wide pass-band type and having a sufficient frequency pass-band width to pass the individual cycles of said high power pulses in rectangular wave form, a wave-shaping passive filter network and an antenna, said passive network being connected to pass said high power pulses directly from said video frequency amplifier to said antenna without further amplification.

2. A radio transmitter for producing and radiating radio pulses of definite wave shape which comprises means for generating periodically recurring pulses each consisting of a group of sine wave cycles recurring at a carrier frequency, means for amplifying and clipping said groups of sine wave cycles to produce high power pulses each consisting of a group of like rectangular pulses recurring at said carrier frequency, and a passive network for filtering said high power pulses to produce pulses of carrier wave energy which have an envelope of predetermined wave shape, and means for radiating said shaped pulses without further amplification.

3. A radio transmitter comprising means including a master oscillator for producing a carrier wave signal having the frequency of the carrier wave signal to be radiated, means for producing periodically recurring pulses of said carrier wave signal, means including an amplifier for converting said pulses into high power pulses each consisting of rectangular pulses recurring at the carrier wave frequency, said amplifier being of the wide pass-band type and having a sufficient frequency pass-band width to pass the individual cycles of said high power pulses in rectangular wave form, a passive filter network that is designed to shape said high power pulses, an antenna and means supplying said high power pulses to said passive network whereby shaped pulses suitable for radiation appear at the output terminals of said network, said passive filter network being connected to pass said high power pulses directly from said amplifier to said antenna without further amplification.

4. The invention according to claim 3 wherein said filter network is a band-pass filter having a pass band that has as its center frequency said carrier wave frequency.

5. The invention according to claim 3 wherein said filter network is a band-pass filter having complementary low-pass and high-pass filters connected in parallel therewith at the input end of the network.

6. A radio transmitter comprising means including an oscillator for producing a carrier wave signal having the same frequency as that of the carrier wave to be radiated, means for producing periodically recurring pulses of said carrier wave signal, means including a video frequency amplifier for converting said pulses of carrier wave signal into high power pulses each consisting of rectangular pulses recurring at the carrier wave frequency, said video frequency amplifier being of the untuned resistor-capacitor coupled type and having a sufficient frequency band-pass width to pass the individual cycles of said high power pulses in rectangular wave form, a passive filter network that is designed to shape said high power pulses, an antenna, and means supplying said high power pulses to said passive network whereby shaped pulses suitable for radiation appear at the output terminals of said network, said passive filter network being connected to pass said high power pulses directly from said video frequency amplifier to said antenna without further amplification.

7. A radio transmitter comprising means including an oscillator for producing a carrier wave signal, means for producing a keying or gating pulse that has a fixed time or phase relation to said carrier wave signal, means for keying or gating said carrier wave signal by said keying or gating pulse for producing periodically recurring pulses of said carrier wave signal, means including a video frequency amplifier for converting said pulses of carrier wave signal into high power pulses each consisting of rectangular pulses recurring at the carrier wave frequency, said video frequency amplifier being of the untuned resistor-capacitor coupled type and having a sufficient frequency band-pass width to pass the individual cycles of said high power pulses in rectangular wave form, a passive filter network that is designed to shape said high power pulses, and means supplying said high power pulses to said passive network whereby shaped pulses suitable for radiation appear at the output terminals of said network.

8. A radio transmitter comprising means including an oscillator for producing a carrier wave signal having the same frequency as that of the carrier wave to be radiated, means for producing periodically recurring pulses of said carrier wave signal, means including an amplifier for converting said pulses of carrier wave signal into high power pulses each consisting of like amplitude rectangular pulses recurring at the carrier wave frequency, said amplifier being of the wide pass-band type and having a sufficient frequency band-pass width to pass the individual cycles of said high power pulses in rectangular wave form, a passive filter network that is designed to shape said high power pulses, an antenna and means supplying said high power pulses to said passive network whereby shaped pulses suitable for radiation appear at the output terminals of said network, said passive filter network being connected to pass said high power pulses directly from said amplifier to said antenna without further amplification.

9. A radio transmitter comprising means including an oscillator for producing a carrier wave signal, means for producing a keying or gating pulse that has a fixed time or phase relation to said carrier wave signal, means for keying or gating said carrier wave signal by said keying or gating pulse for producing periodically recurring pulses of said carrier wave signal, means including an amplifier for converting said pulses of carrier wave signal into high power pulses each consisting of like amplitude rectangular pulses recurring at the carrier wave frequency, said amplifier being of the wide pass-band type and having a sufficient frequency band-pass width to pass the individual cycles of said high power pulses in rectangular wave form, a passive filter network that is designed to shape said high power pulses, and means supplying said high power pulses to said passive network whereby shaped pulses suitable for radiation appear at the output terminals of said network.

STUART W. SEELEY.

References Cited in the file of this patent

UNITED STATES PATENTS

| Number | Name | Date |
|---|---|---|
| 2,207,796 | Grundmann | July 16, 1940 |
| 2,266,401 | Reeves | Dec. 16, 1941 |
| 2,280,707 | Kell | Apr. 21, 1942 |
| 2,321,291 | Grundmann | June 8, 1943 |
| 2,401,807 | Wolff | June 11, 1946 |
| 2,419,193 | Bartelink | Apr. 22, 1947 |
| 2,459,809 | Gorham et al. | Jan. 25, 1949 |
| 2,467,308 | Hansell | Apr. 12, 1949 |
| 2,487,768 | Watts | Nov. 8, 1949 |

OTHER REFERENCES

"Pulsing Amateur Transmitters," Radio, February 1939, pages 28 to 34 and 82.